United States Patent [19]
Lampi et al.

[11] Patent Number: 5,465,654
[45] Date of Patent: Nov. 14, 1995

[54] PAN FOR BAKING, FRYING, AND BRAISING, AND PAN STACKING SYSTEM

[75] Inventors: Rauno A. Lampi, Westboro, Mass.;
John N. Bindon, Sunnyvale, Calif.;
Anthony J. G. Bowles, Orinda, Calif.;
Thomas R. Parks, Sunnyvale, Calif.

[73] Assignee: Food and Agrosystems, Inc., Sunnyvale, Calif.

[21] Appl. No.: 154,961

[22] Filed: Nov. 19, 1993

[51] Int. Cl.⁶ .................................................. A47J 37/10
[52] U.S. Cl. ................... 99/422; 99/426; 99/448; 220/912
[58] Field of Search .................. 99/422, 423, 424, 99/426, 448, 449, 450, 474, 475, 645; 219/400; 126/21 A; 220/661, 663, 912

[56] References Cited

U.S. PATENT DOCUMENTS

| | | | |
|---|---|---|---|
| 754,310 | 3/1904 | Horine | 99/422 |
| 1,957,133 | 5/1934 | Davis | 99/424 |
| 2,102,097 | 12/1937 | Sherman | 99/450 |
| 2,367,448 | 1/1945 | Thiele | 99/426 |
| 2,906,620 | 9/1959 | Jung | 219/400 |
| 3,261,650 | 7/1966 | Stromqvist | 34/196 U |
| 3,493,726 | 2/1970 | Bardeau | 99/422 |
| 3,749,000 | 7/1973 | Vidjak et al. | 99/448 |
| 3,801,507 | 8/1974 | Wheaton | 99/428 |
| 3,831,508 | 8/1974 | Wallard | 99/440 |
| 3,987,719 | 10/1976 | Kian | 99/422 |
| 4,052,589 | 10/1977 | Wyatt | 99/474 |
| 4,112,916 | 9/1978 | Guibert | 99/448 |
| 4,173,179 | 11/1979 | Arthur | 99/374 |
| 4,307,286 | 12/1981 | Guibert | 219/400 |
| 4,329,977 | 5/1982 | Orter | 99/450 |
| 4,503,759 | 3/1985 | Haas | 99/380 |
| 4,970,949 | 11/1990 | Ferrara | 99/374 |
| 5,065,889 | 11/1991 | Conti | 220/912 |
| 5,154,115 | 10/1992 | Kian | 99/380 |
| 5,232,609 | 8/1993 | Prevost et al. | 99/450 |

*Primary Examiner*—David A. Scherbel
*Assistant Examiner*—Reginald L. Alexander
*Attorney, Agent, or Firm*—George W. Wasson

[57] ABSTRACT

A convenient serving-size pan (10) with flange (13), and flanged lid (11) removably attached by a hinge (14), enabling a wide range of pourable, particulate, and solid foods to be cooked in quantity in forced-air convection ovens. The pan and lid are fabricated of highly heat conductive materials with interior surfaces suitable for direct food contact. Exterior surfaces of the pans are smooth and plain to minimize insulative film coefficients and maximize heat transfer. A vertical stacking system provides effective use of oven space while maintaining sufficient space between pans for effective heat transfer.

7 Claims, 4 Drawing Sheets

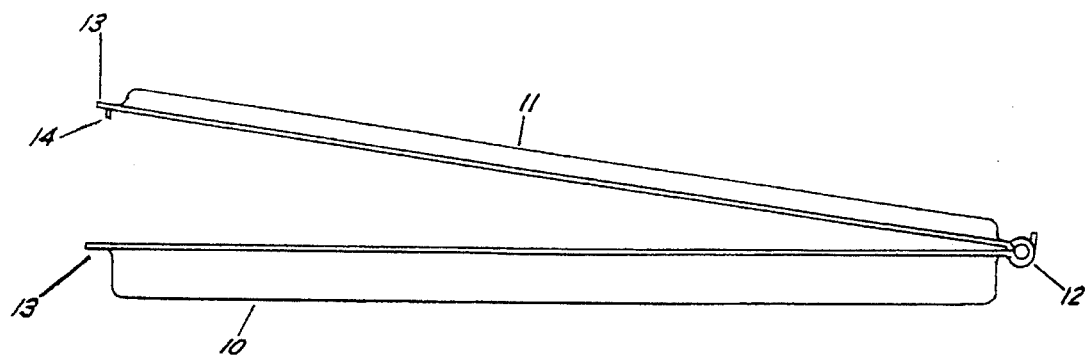
FIGURE 1
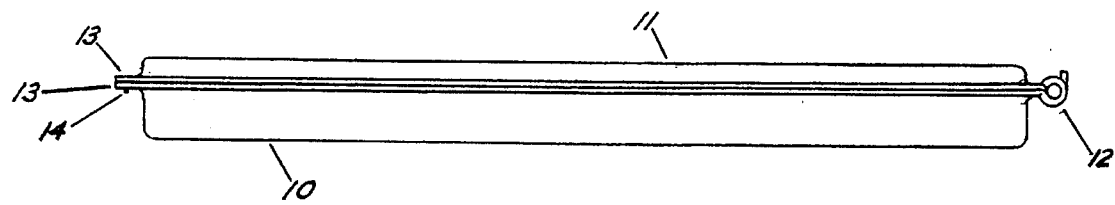
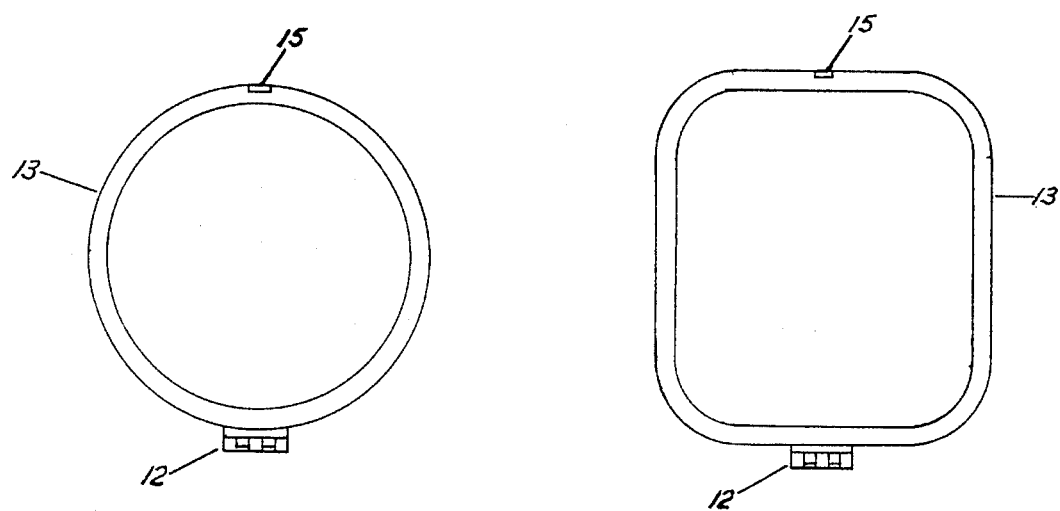
FIGURE 2

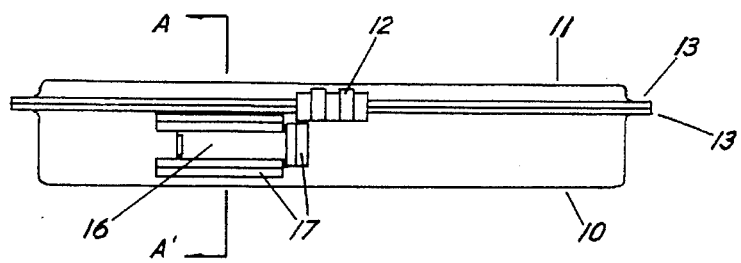
FIGURE 3
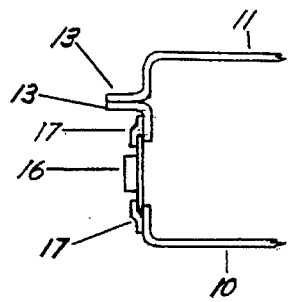
DETAIL - A-A' OPENABLE "WINDOW"
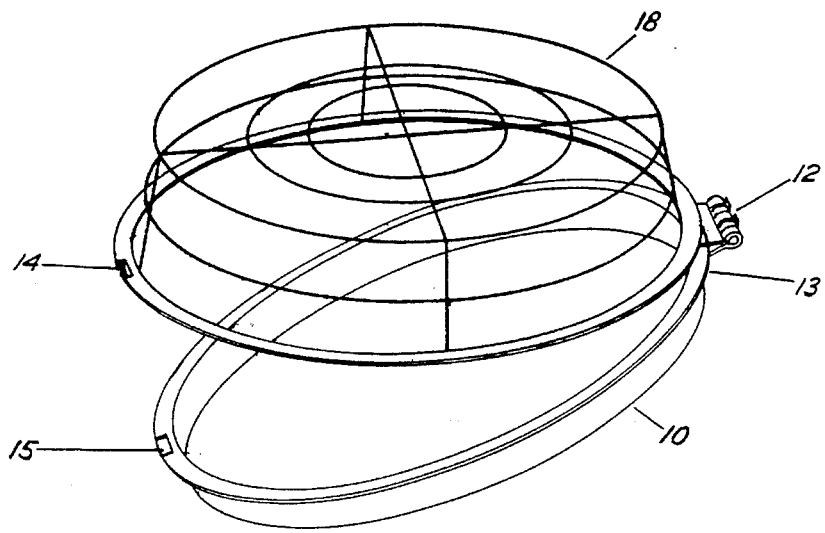
FIGURE 4

DETAIL A-A'

DETAIL B-B'

DETAIL C-C' (AS ASSEMBLED)

5,465,654

PAN FOR BAKING, FRYING, AND BRAISING, AND PAN STACKING SYSTEM

BACKGROUND, FIELD OF INVENTION

This invention relates to baking, frying, braising, and sauteing pans, specifically to pans to reduce the time, space, labor, and energy requirements for cooking pancakes, meatloafs, hamburgers, sauteed mushrooms, hashed brown potatoes, and other foods in forced air convection ovens.

BACKGROUND, DISCUSSION OF PRIOR ART

Despite the popularity of pancakes and waffles, cooking procedures for these and many other foods remain essentially the same as they were 75 to 100 years ago. In the procedure for pancakes, a measured amount of batter is dispensed onto a hot griddle, which heats by direct conductivity. After bubbles appear at the top surface of the batter and burst, and the top surface of the batter loses its sheen, the pancake can be flipped over to cook the second side. Hamburgers, potato pancakes, and other particulate foods require the same basic treatment, being heated first on one side, and then turned to be heated on the other.

The food service industry aims at providing the needed quantities of the desired foods to its customers quickly and efficiently. To minimize cost, labor requirement is minimized, and equipment should be versatile, compact, and easy to clean, maintain, and repair; and thermal response time should be as rapid as possible to minimize energy needs.

Equipment developed to speed up food preparation for food service operations has included microwave ovens, combination ovens, pressure fryers, and pressure steamers. Unfortunately advances in griddle design have not progressed similarly, with the result that production of many foods such as pancakes, hashed brown potatoes and similar products remains a function of griddle surface available. Since griddles take considerable time to reach temperature due to their mass, the need to be able to make pancakes and similar items quickly has dictated that griddles remain heated, consuming energy.

U.S. Pat. No. 3,801,507 describes a three piece baking mold designed for the production of shaped two-piece sandwich buns in which the bottom part is bowl-shaped to better accommodate sandwich filling materials. While this concept is adaptable to a range of heating systems, the design of these molds and their construction is very limited in function, and not suitable for the production of pancakes, french toast, hamburgers, hashed brown potatoes, waffles and similar products.

U.S. Pat. No. 3,831,508 presents a two-piece pan for making decorative shapes using eggs and other liquid, thermosetting foods in toasters and standard ovens. Because of the liquiform nature of these foods, this pan must achieve a leak-tight seal between the lid and base of the pan. The pans described have a flat lid, with a body providing the desired molding patterns. The emphasis of this patent is on molding pourable foods. While interesting for the domestic production of novelty foods, the design limitations restricting this invention to liquiform or pourable materials ignores commercial applications. The need of the food service industry is for versatile equipment that can also accommodate particulate materials such as sliced carrots, hashed brown potatoes, and beans, or solid foods such as hamburger patties, sliced meatloaf, tempe, tofu, or french toast.

U.S. Pat. No. 4,173,179 applies to an electrically heated appliance for grilling hamburgers and similar products. In this invention, two molded, heat conductive plates are attached by hinges to an electrically heated center plate, providing two cooking chambers, one on either side of the center plate, providing a capability of cooking two hamburgers at one time. All three plates are equipped with handles to facilitate opening and closing the cooking compartments. In addition to the three plate heating assembly, the appliance includes a base which serves as a drip pan and can hold the heating assembly in either the vertical or horizontal position.

U.S. Pat. No. 4,503,759 describes hinged plates used for baking wafer products. While the heating can be done using hot gases, provision is made for alternative heating modes by the embedding of resistance heating elements in the plates. This and the design of the plates make this device too heavy, cumbersome, and limited in application and production capability to satisfy the objectives addressed in this application. Other limitations on the usefulness of this invention include its restriction to products made from batters and pourable mixes.

U.S. Pat. No. 4,970,949 describes a cooking device consisting of disc-shaped molds separated by resistance heating elements dedicated to the production of baked cakes, muffins, and breads from pourable batters. While it accomplishes the objective of cooking on both sides simultaneously, it is apparent from the design that there are practical limitations to the thickness and diameter of products that could be prepared in this device, as well as to the number of products that could be prepared at one time. To the kitchen already crowded with appliances, the unit represents one more piece of equipment with limited application.

U.S. Pat. No. 5,154,115 applies to a two-piece baking mold for making pizza crusts from a pourable batter, in which the molds are configured to create a crust with a raised rim. The molds are designed to use a resistance coil device or standard oven as a source of heat, but are too heavy, cumbersome, and limited in application to achieve the objectives addressed in this application. In operation the mold is designed to be removably attached to a heating appliance to accomplish the actual cooking step. This would unduly limit the production capability established as an objective of our invention.

The above prior art inventions relate primarily to domestic or extremely small food production applications which do not require the degree of versatility, labor reduction, energy reduction, and production rate needed by food service operations. As such, most are designed for manual operation, are restricted in production capacity, or are very limited in terms of the products they can handle. The wafer units cook both sides of a food simultaneously but are restricted to pourable batters only, as are the egg boiler or cooker, and the vertically aligned batch baker. The baking pan assembly has novel aspects, but is again limited to pourable batters. A further disadvantage to the baking pan assembly is the complexity of the mold.

The cooking assembly described in U.S. Pat. No. 4,173, 179 has the advantage of being able to cook solid foods, but has the serious disadvantage of limited capacity, while the requirement for drip holes to drain fat from the cooking compartments preclude the use of this appliance for batter-based products, braising, or sauteing.

Since only the center plate is heated, it would be necessary to "turn" the material being cooked to ensure that both sides are cooked adequately, thus requiring additional labor.

The two pizza crust forming pans require a plastic dough, with the result that the pans suggested in these patents would be totally unsuited for the broad range of products and cooking processes for which our invention is designed.

The introduction of high air velocity convection ovens has provided a uniquely versatile cooking device. Currently available models of high air velocity convection ovens, providing air velocities as high as 2200 feet per minute, are designed for the domestic market. While they are highly energy efficient and can compete favorably with microwave ovens in terms of cooking time, these domestic units have restricted capacity, limited effectively to 2–4 persons. Since foods being cooked in these units are currently held on wire racks, a significant shortcoming of these units is their present inability to cope with such popular foods as pancakes, french toast, hashed brown potatoes, and braised or sauteed foods.

Because of the high heat transfer efficiencies and rapid response available with the high air velocity cooking concept, it is felt that units designed for larger capacity would be particularly well suited for commercial food service. Necessary components for an effective food service unit include convenient serving-size pans to provide greater product versatility, and systems for vertical stacking pans to make better use of oven chamber volume. Attributes required in pans for food service applications include high rates of heat transfer, smooth surfaces to minimize film coefficient and air resistance, unobstructed surfaces to optimize air-surface contact, PTFE coatings to minimize cleanup labor, and sanitary design and construction.

While the above prior art may meet some of these criteria, none offer the versatility and operational efficiency required in food service applications.

OBJECTS AND ADVANTAGES

Several objects and advantages of the present invention are:

a) to provide a convenient serving-size cooking container for baking, frying, braising, and sauteing foods in forced air convection ovens;

b) to provide a cooking container which allows for efficient and rapid heat transfer from a hot, high velocity forced-air heating medium to the cooking container contents;

c) to provide a cooking container which reduces the time and labor required to bake or cook products such as pancakes, sliced meatloaf, or grilled cheese sandwiches by heating them on both sides simultaneously;

d) to provide a cooking container which has plain, smooth, unobstructed surfaces to minimize air resistance and insulative film coefficients, and maximize effective thermal gradients at the external cooking container surface;

e) to provide a cooking container with smooth, plain, easily contacted surfaces free of embossing, grooves or ridges, for ease of cleaning and sanitation;

f) to provide a cooking container fabricated of materials suitable for contact with food, and possessing high thermal conductivity;

g) to provide a cooking container which, with the addition of PTFE coating or commercially available spray-on release agents, can be used for reduced fat food formulations, and minimize clean-up requirements;

h) to provide a system for use with these cooking containers which would allow them to be stacked vertically to make efficient use of available oven space without obstructing the circulating hot air heating medium.

Still further objects and advantages will become apparent from a consideration of the ensuing description and drawings.

DESCRIPTION OF DRAWINGS

As required, detailed features of this invention are disclosed herein; however, it is understood that the disclosed features are example in nature, related to this invention, and may be embodied in various forms. Therefore structural and functional details herein shall not be interpreted as limiting.

FIG. 1 shows as one example of this invention, a shallow cooking container that could be used for the baking of such foods as pancakes, sliced meatloaf, sauteing mushrooms, and the frying of french toast and hashed brown potatoes. Throughout this specification the cooking container will be referred to as having a cooking container portion forming the base of the container and a pan lid portion forming the cover for the base. The pan has a removably hinged lid, and may be coated on the inside (both pan and lid) with non-stick materials such as PTFE or sprayed with a commercially available non-stick material.

FIG. 2 shows two possible pan configurations as examples.

FIG. 3 illustrates an alternative pan configuration suitable for liquiform, pourable ingredients such as batter, in which the batter is injected into the pan through a closeable side "window" using a syringe.

FIG. 4 shows an alternative configuration for pans used in certain conditions in which the products might need to be restrained during cooking. In this configuration, the solid lid is replaced by a wire lid, permitting the pan to be used in applications such as baking potatoes or the baking and browning of casseroles.

LIST OF REFERENCE NUMERALS

Figure 5:
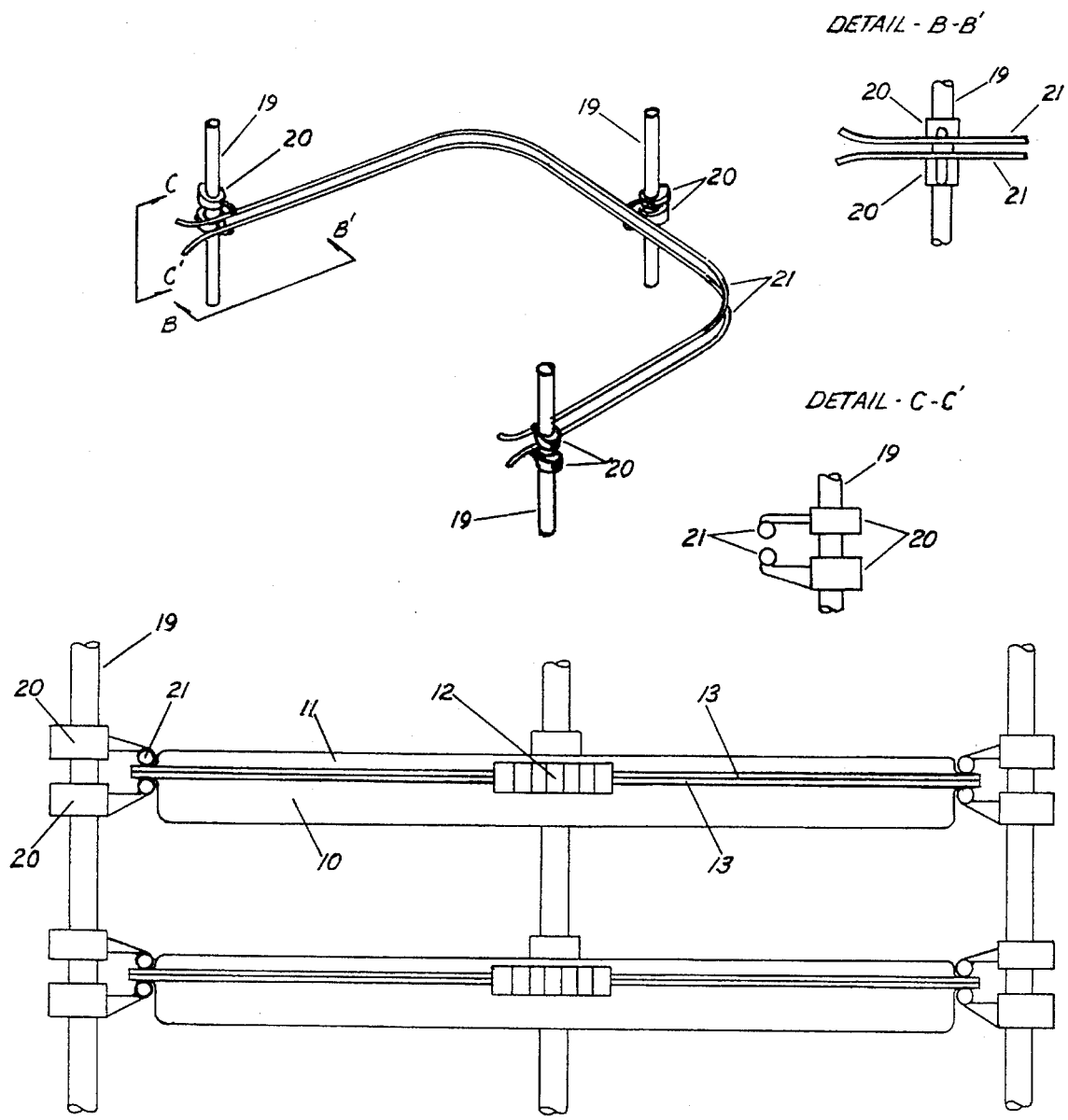
FIG. 5 shows a possible rack configuration which could constrain and separate pans such as shown in FIGS. 1 and 2, and maintain lid closure. The pan spacing is adjustable to permit the rack's use with pans with a deeper draw, or pans such as shown in FIG. 4 with a raised screen lid.

10 - Pan
11 - Lid
12 - Hinge
13 - Flange
14 - Projection for pan-lid indexing
15 - Notch/depression for pan-lid indexing
16 - Slide-gate for openable "window"
17 - Slide-guide for openable "window"
18 - Wire lid
19 - Vertical post
20 - Adjustable sleeve
21 - Support rods
22 - Closed pan
23 - Open pan
24 - Circulation port
25 - Indentation around entire pan circumference
26 - Intermittent indentation
27 - Food being baked/fried/braised/sauteed

DESCRIPTION OF INVENTION

FIG. 1 shows an example of a cooking container (10) for baking, frying, braising, and sauteing foods in accordance with this invention. The cooking container including a pan has a lid (11) removably attached at a hinge (12). Both the pan (10) and lid (11) have flanges (13) to facilitate maintaining closure and pan position during baking. At one or more positions lid (11) has a slight downward projection (14) which mates with a corresponding notch (15) on pan (10) for proper alignment.

The size and depth of the pan(s) used may be varied in pan/lid depths as needed to accommodate the types and size of foods being baked. Since this invention is primarily intended for use in convection ovens, it is important that pan exterior (pan and lid) surfaces have as unobstructed exposure to the hot circulating air as possible. Accordingly, it is desirable that the draw depth of the lid be such as to at least equal the height of any rack, restrainer, or closing mechanism in contact with the lid flange. The configurations of the pan and lid may be changed to suit product requirements. Since a major objective of the design of this invention is maximizing heat transfer, it is imperative that every possible feature that could contribute to improved heat transfer be incorporated, including unimpeded contact between the hot, circulating oven air and the pan surface, and the use of smooth exterior pan surfaces to minimize film coefficients and air resistance. Similarly, features that contribute to obstructing air flow such as embossed patterns, grooves, or ridges are eliminated. Unless specifically required for certain product attributes, it is desirable that the pan should be constructed of thin, polished, highly heat-conductive metals of uniform thickness. Use of metal laminates combining metals with high heat conductivity with alloys acceptable for direct contact with foods is particularly desirable.

FIG. 2 shows both circular and oblong configurations, however, other shapes are certainly possible. Trials of a cooking container similar to the circular pan described in FIGS. 1 and 2 demonstrated that excellent pancakes using standard commercial mixes could be made in a commercially available high air velocity convection oven, such as the American Harvest Jetstream Oven manufactured by Alternative Pioneering Systems, Inc. of Chaska, Minn.

For those food service operations which serve largely batter-based foods, such as pancakes or waffles, it may be desirable to more highly automate the pan filling operation. FIG. 3 illustrates a cooking container configuration designed to be filled by a manual or automatic syringe. Pans would be provided with a closeable "window" (16, 17) located at the side of the pan near the hinge (detail A–A'). In this modification, empty pans would be placed in the rack with windows in the open position facing the operator. The operator would serially inject the appropriate amount of batter into each pan, close the "window", insert the rack into oven, and initiate the baking cycle.

Not all foods are suitable to be cooked in a closed container. These include baked potatoes and casseroles. Baked potatoes benefit from some surface dehydration to achieve a crispy skin, and casseroles usually benefit from a degree of surface browning. FIG. 4 shows an arrangement to accommodate these product needs in which the lid of a shallow pan is replaced by a deep(high) wire lid (18) designed to restrain the product while permitting a maximum of hot air-product contact.

FIG. 5 shows an illustration of a possible rack design for use with pans of the general type shown in FIGS. 1 and 2. The function of this rack is to constrain, separate, maintain closure of the pans, and provide maximum unobstructed contact between the pan surfaces and the hot, high speed gases of the oven. Shape and structure of the rack are not critical so long as the above functions are provided. The example shown in FIG. 5 consists of three vertical posts (19) on which are movably mounted pairs of sleeves (20), which in turn support rods (21) in such a way that pairs of rods are positioned parallel to one another in a vertical plane (see details B–B' and C–C').

The spacing between the pairs of rods for a given pan configuration will depend on the combined thickness of the pan and lid flanges. Depending on flange thickness, the best approach may be to initially adjust the rods so they almost touch, with the result that when the full pans are placed in the unit, the top rod mounting would flex and provide a modest closure force. The general assembly sketch shows this type of rack configured to accommodate either circular or oblong pans.

Spacing of the support rods between pans will depend on the depth of pans being used, and is adjustable. The height of the vertical members will be a function of oven type and size, and for that reason are replaceable. It is not intended by these figures to limit the application in configuration or application. For example, the figures show shallow pans as might be desirable for production of pancakes, however, rack configurations enabling multiple pocket pans or deeper pans are also embodied in this concept.

Figure 6:
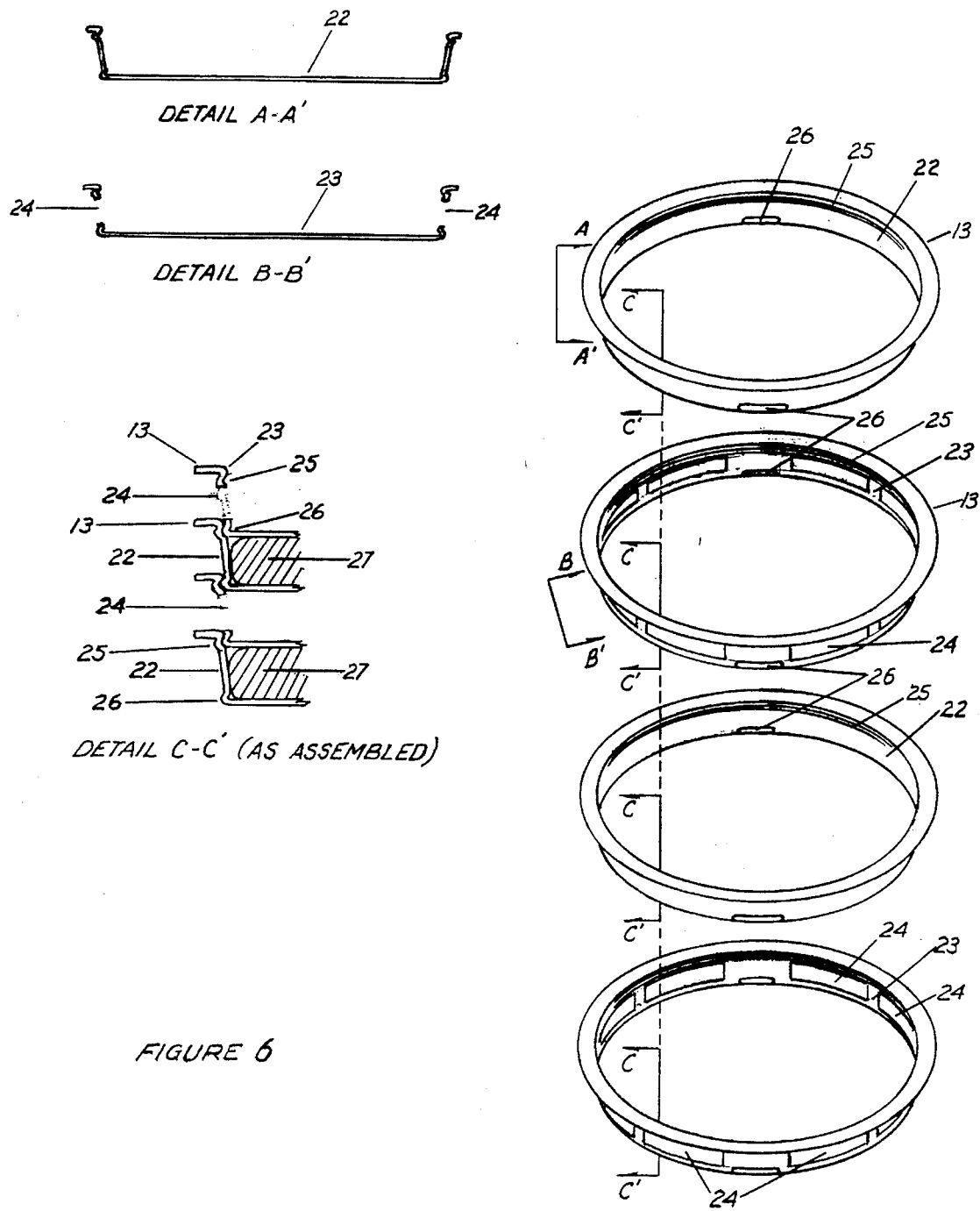
FIG. 6 shows an alternative pan design which uses a nesting feature to eliminate the lid and provide a "built-in" stacking capability which eliminates the need for a rack to separate the pans and maintain pan closure.

FIG. 6 shows an alternative pan design for pancakes and similar products which would possibly be less expensive to fabricate and incorporate a built-in stacking feature to eliminate the need for a separate pan rack in the oven.

In this configuration, two types of pans are involved. As shown in details A–A' and B–B', the closed pan (22) has solid sides to contain the materials (27) being baked, and the open pan (23) which has a significant amount of the side area open as "circulation ports" (24) to enable the hot oven gases to adequately contact the "top" and "bottom" surfaces.

Both types of pans have a flange (13) to serve as a strengthening member and facilitate de-stacking. Immediately below this flange on both types of pans is a shallow indentation (25) in the internal surface extending around the complete circumference of the pans. On both types of pans, there is a second indentation (26), located on the side, where the side turns to meet the bottom surface. This indentation is intermittent around the circumference, and is sufficiently deep to provide a small raised area on the external surface of the pan. The specific geometry of the indentations is not critical. Their objective and function is shown in detail C–C' in which the pans are shown stacked, with the bottom intermittent indentations positioned in the top continuous indentations as a friction fit to maintain the stacked position and spacing.

As in the case of the pans configured for use with racks, the configurations and geometries illustrated in these figures are intended as examples of potential examples only, and should not be construed as limitations on the invention. In the figures, shallow pans suitable for pancakes are used, however, smaller or deeper pans, such as for vegetables or other baked goods would be equally applicable under this invention. Similarly, the depth of the open and closed pans do not need to be equal. The function of the open pans is to provide proper spacing and effective circulation of the hot oven gases over the pan surfaces, accordingly, the depth of the open pans could be significantly different from that of the closed pans.

OPERATION OF THE INVENTION

FIGS. 1 through 5

To make pancakes in actual production, the operator would raise the lid (11) of a clean pan (10) and dispense into the pan a needed amount of batter. The lid would be lowered. The operator would grasp the pan at the hinge position and slide it into the rack so that the flanges of the pan and lid fit between the upper and lower support rods as shown in FIG. 5. Detail C–C' shows an elevation view of pans as properly placed in the rack. When loaded with pans, the rack unit would be placed in the oven and the baking cycle initiated. On completion of the required bake time, the pan is opened and the pan-cake removed for serving. The pan would then be wiped clean and refilled with batter as needed.

For those food service operations which primarily serve batter-based foods, such as pancakes or waffles, it may be desirable to more highly automate the pan filling operation. FIG. 3 illustrates a cooking container configuration designed to be filled by a manual or automatic syringe. Pans would be provided with a closeable "window" (16, 17) located at the side of the pan near the hinge (detail A–A'). In this modification, empty pans would be placed in the rack with windows in the open position facing the operator. The operator would serially inject the appropriate amount of batter into each pan, close the "window", insert the rack into oven, and initiate the baking cycle. On completion of the baking cycle, the pans would be taken from the rack and opened, the pancakes would be removed and placed on plates or eating trays for serving.

FIG. 6

In use, the operator would dispense a desired amount of food (27) to be baked, fried, braised, or sauteed into a solid-sided pan. An open-sided pan would then be placed on top and pressed down to engage the intermittent raised areas at its bottom edge with the continuous indentation below the top flange of the filled solid pan. In doing this, the bottom of the open-sided pan becomes the top of the filled, solid-sided pans. This alternating pattern of filled, solid pans topped by open pans would be carried on as needed, compatible with the dimensions and configuration of the oven compartment and according to the amount of food needed. When the stack reaches the appropriate height or the required amount of food had been placed in the trays, the stack would be transferred to the oven for baking.

SUMMARY, RAMIFICATIONS, and SCOPE

The cooking containers or pans embodied in this invention enable a wide variety of foods, in convenient portion sizes, to be baked, fried, sauteed, or braised in quantity in forced-air convection ovens. These pans have additional advantages in that:

Use of these pans allows food to bake on both sides simultaneously, reducing labor by avoiding the need for turning.

The smooth exterior pan surfaces and absence of embossing, grooves, and ridges minimizes air resistance and film coefficients, improving heat transfer and reducing cook times.

The use of circulating air as a heat transfer medium enables significant energy savings because of its rapid response time. The stacking systems embodied in this invention permit large quantities of food to be prepared in a modest space. The use of PTFE coatings or other commercially available spray on release agents permit the use of reduced fat food formulations and reduce time required for clean-up.

Although the description above contains many specificities, these should not be construed as limiting the scope of the invention but as merely providing illustrations of some of the presently preferred embodiments of this invention. For example, the pans can have other shapes such as oval; the alignment notch can have other shapes; and hinged closure can be replaced by a friction fit which connects the otherwise unconnected halves, etc.

Thus, the scope of the invention should be determined by the appended claims and their legal equivalents, rather than by the examples given.

We claim:

1. A cooking container for use in a convection oven wherein high temperature air is circulated at high speed around said cooking container to transfer heat to said cooking container and to cook articles contained within the interior of said cooking container, said cooking container comprising:

a) a pan having a bottom wall and a continuous sidewall, said bottom wall and pan sidewall defining interior and exterior surfaces of a base of said container, b) a continuous pan flange formed about the periphery of said continuous pan sidewall, said pan flange extending outwardly from said sidewall to form a flanged base for said container, c) a pan lid having a top wall and a continuous sidewall, said top wall and pan lid sidewall defining interior and exterior surfaces of a mating pan lid for said pan, d) a continuous pan lid flange formed about the periphery of said continuous sidewall of said pan lid, said pan lid flange extending outwardly from said pan lid sidewall to form a flanged cover for said container, e) said pan bottom wall and said pan lid top wall being substantially flat, smooth and of uniform thickness, f) said pan flange and said pan lid flange being formed with cooperating hinge structures adapted to permit said pan and pan lid to be hinged into mating alignment and to be moved with respect to each other to permit access to said interior of said container, g) a projection extending from said pan lid flange, a notch in said pan flange, said projection and notch being adapted to cooperate to align said pan lid against said pan when said pan lid and pan are moved about said cooperating hinge structure to mate said pan lid against said pan, h) said pan and said pan lid being fabricated of laminated metals with said exterior surface of said pan and pan lid being high thermal conductivity metal and said interior surface of said pan and pan lid being a metal suitable for direct contact with foods to be cooked within said container, i) and said pan and pan lid when mated with each other defining a cooking container having a pan/lid depth.

2. The cooking container of claim 1 wherein said exterior surfaces of said pan and said pan lid are copper.

3. The cooking container of claim 1 wherein said exterior surfaces of said pan and said pan lid are aluminum.

4. The cooking container of claim 1 wherein said interior surfaces of said pan and said pan lid are stainless steel.

5. The cooking container of claim 1 wherein said interior surfaces of said pan and pan lid are coated with polytetraflouroethylene (PTFE).

6. A cooking container stacking system for use with said cooking container of claim 1 in a convection oven adapted to place said cooking containers within said oven in stacked adjacent alignment with spacing between the exterior surface of a pan lid and a pan base of the next adjacent cooking container and to space said stacked cooking containers from the interior walls of said oven, said cooking containers having mating pan and pan lid surfaces with mating flanges on said pan and pan lid at said mating surfaces, said stacking system comprising:

a) a plurality of vertical members adapted to be positioned within said oven, b) a plurality of paired support rods, said support rods being individually adjustably positionable along said vertical members to place said support rods perpendicular to said vertical members, said paired support rods extending between said vertical members and defining a cooking container support means open at one side and continuous at another side, said support rods being parallel to each other in said pairs, said paired support rods defining container support means adapted to cooperate with said mating flanges of said container pans and pan lids, c) and said support rod pairs terminating in alignment with each other to define entry/exit spaced openings to said paired support rods at said one side of said paired support rods whereby said cooking containers may be inserted between paired support rods at said entry/exit openings with said mating flanges of a cooking container cooperating with said paired support rods and adjacent stacked cooking containers may be spaced from each other within said oven.

7. The cooking container stacking system of claim 6 wherein said individually adjustably positionable paired support rods are adapted to be movable along said vertical members to permit stacking of cooking containers having different pan/lid depths within said stacking system.

* * * * *